Dec. 27, 1932.    W. T. ESCH    1,892,235
HEN'S NEST
Filed Aug. 18, 1930    3 Sheets-Sheet 1

Inventor
W. T. Esch
By Lacey & Lacey,
Attorneys

Dec. 27, 1932.  W. T. ESCH  1,892,235
HEN'S NEST
Filed Aug. 18, 1930   3 Sheets-Sheet 2
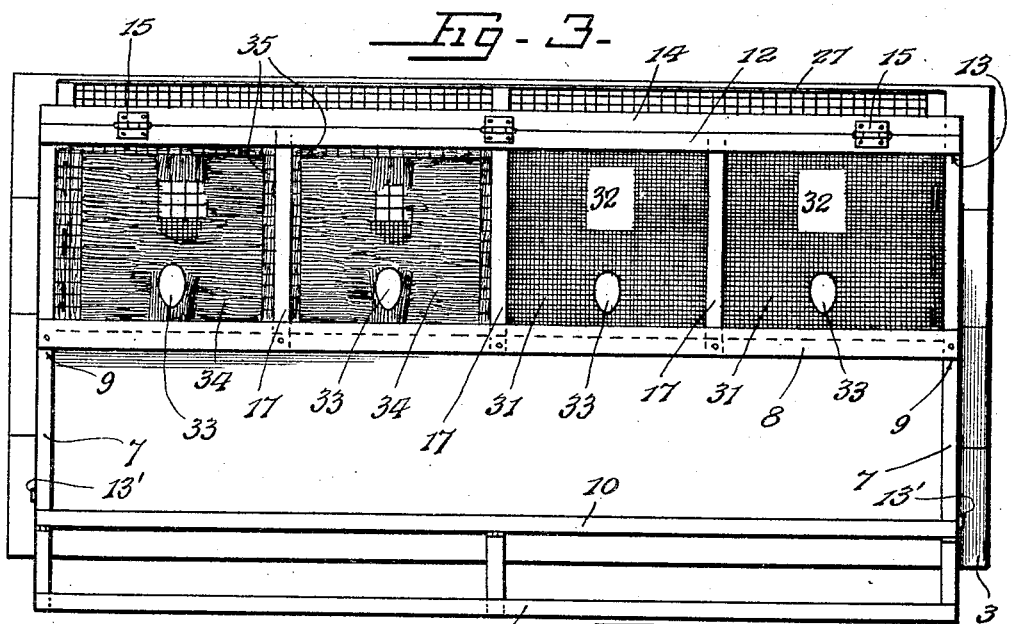
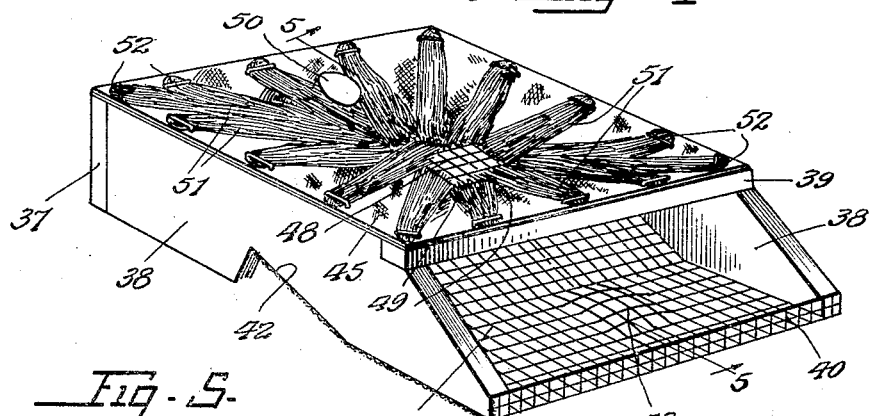
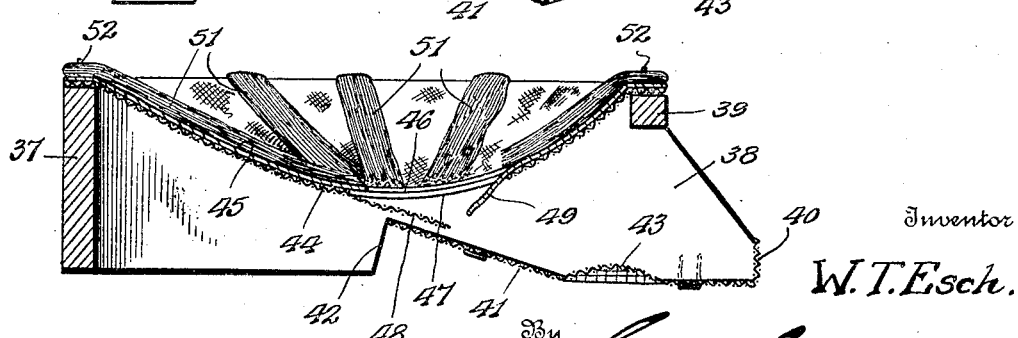
Inventor
W. T. Esch.
By Lacey & Lacey,
Attorneys Dec. 27, 1932.  W. T. ESCH  1,892,235
HEN'S NEST
Filed Aug. 18, 1930  3 Sheets-Sheet 3

Inventor
W. T. Esch.
By Lacey & Lacey
Attorneys

Patented Dec. 27, 1932

1,892,235

UNITED STATES PATENT OFFICE

WILLIAM T. ESCH, OF KALAMA, WASHINGTON

HEN'S NEST

Application filed August 18, 1930. Serial No. 476,183.

This invention relates to animal husbandry and more particularly to a nest for use in a poultry house to be occupied by hens while laying eggs.

One object of the invention is to provide a device of this character so constructed that when an egg is laid it will roll through an opening in the seat or platform of a setting tray into the lower portion of the tray, thereby preventing the egg from being eaten and also prevented from being accidentally stepped upon and broken.

Another object of the invention is to provide the laying tray with an improved type of bottom of such construction that an egg will not be liable to be broken when it drops thereon from the laying seat or platform and further to so construct the tray that eggs may be removed from the tray without disturbing a hen occupying the nest.

Another object of the invention is to so form the tray that the seat will be very comfortable.

Another object of the invention is to permit the tray to be withdrawn from the nest thereby allowing the tray and also the nest itself to be thoroughly cleaned when necessary.

Another object of the invention is to provide a device of this character wherein a number of nests may be arranged side by side and trays for the nest formed as a unit and adapted to be set in place or removed as a unit.

Another object of the invention is to so form the improved nest that when the laying tray is set in place it will terminate in spaced relation to an entrance to the nest thereby providing an entrance space or chamber adapted to have gypsum or other suitable material placed therein to cleanse a hen's feet and prevent the seat of the laying tray from being soiled by mud when a hen occupies the nest.

Another object of the invention is to permit one tier or row of nests to be set upon another so that the upper tier forms a roof or top for the lower tier and also provides a cover or top adapted to be applied to the upper tier or to the lower tier in case an upper tier is in use. By this arrangement as many tiers of nests may be erected as found necessary and other tiers may be added when needed.

Another object of the invention is to prevent eggs from becoming soiled thereby keeping them clean and permitting a higher price to be obtained.

The invention is illustrated in the accompanying drawings, wherein

Figure 1:
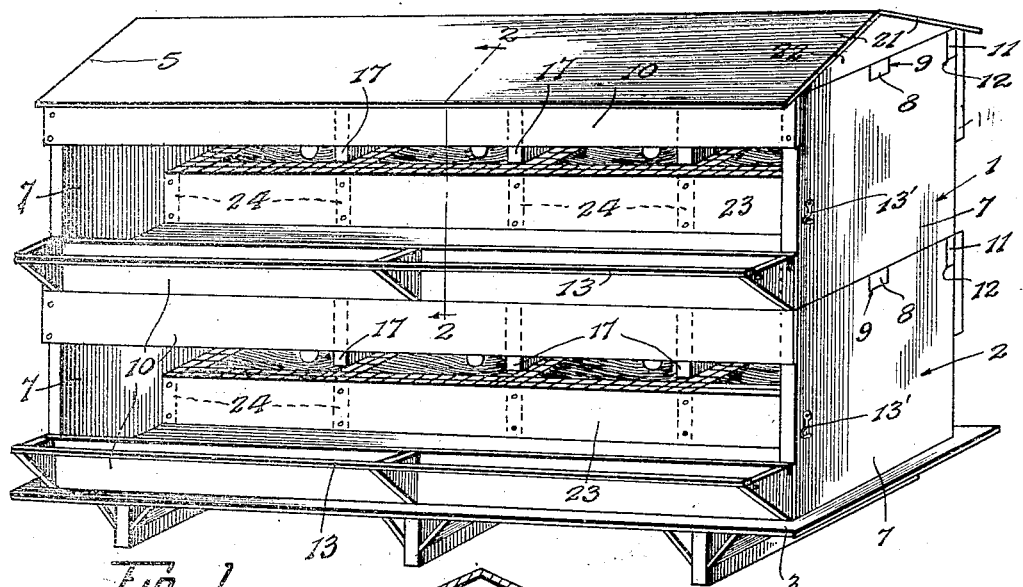

Figure 1 is a perspective view showing nests of the improved construction arranged in tiers one upon another and a cover applied to the upper tier.

Figure 2:
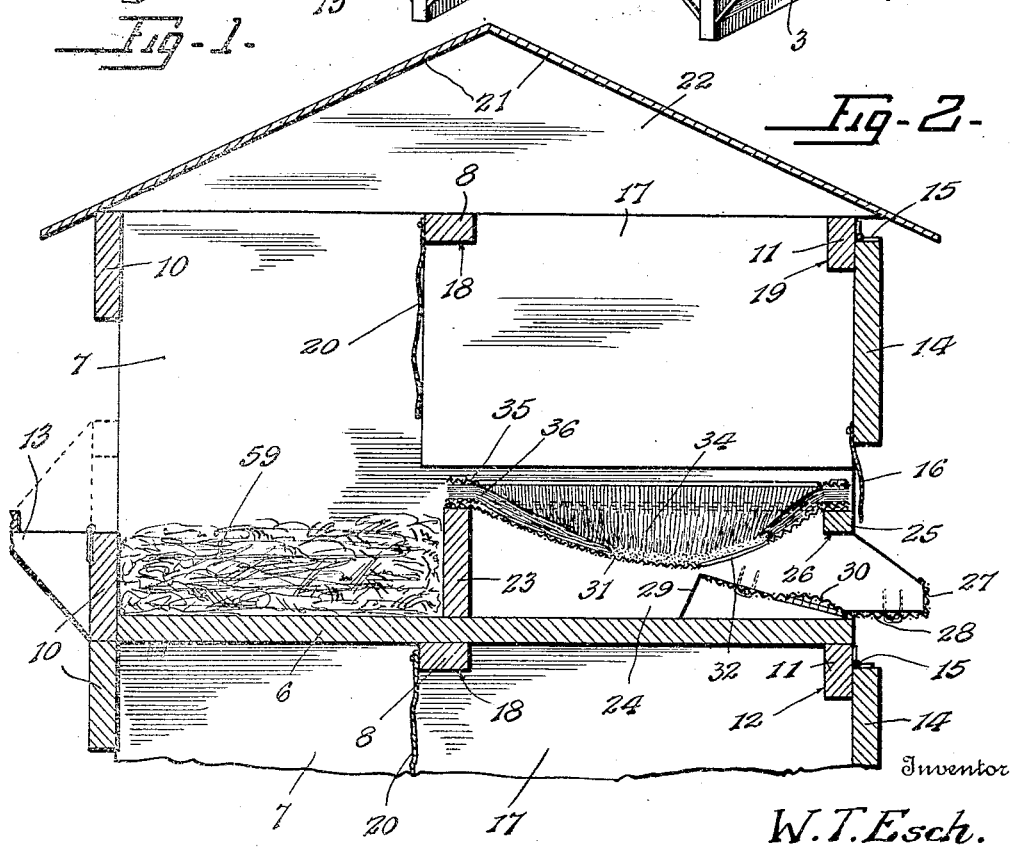
Figure 6:
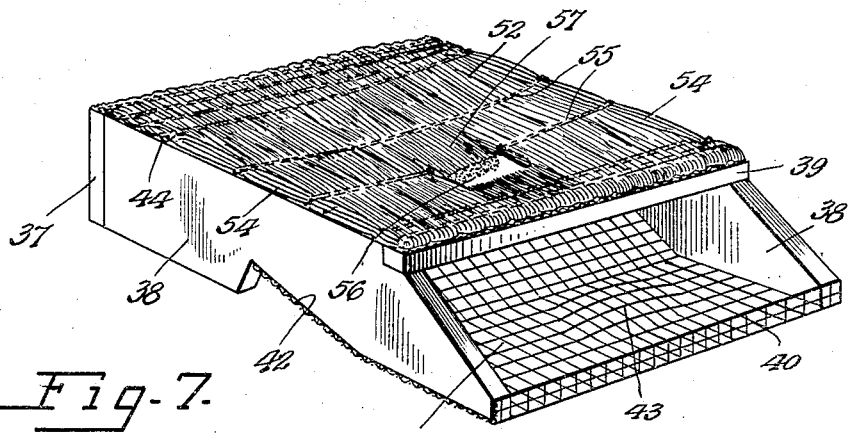
Figure 7:
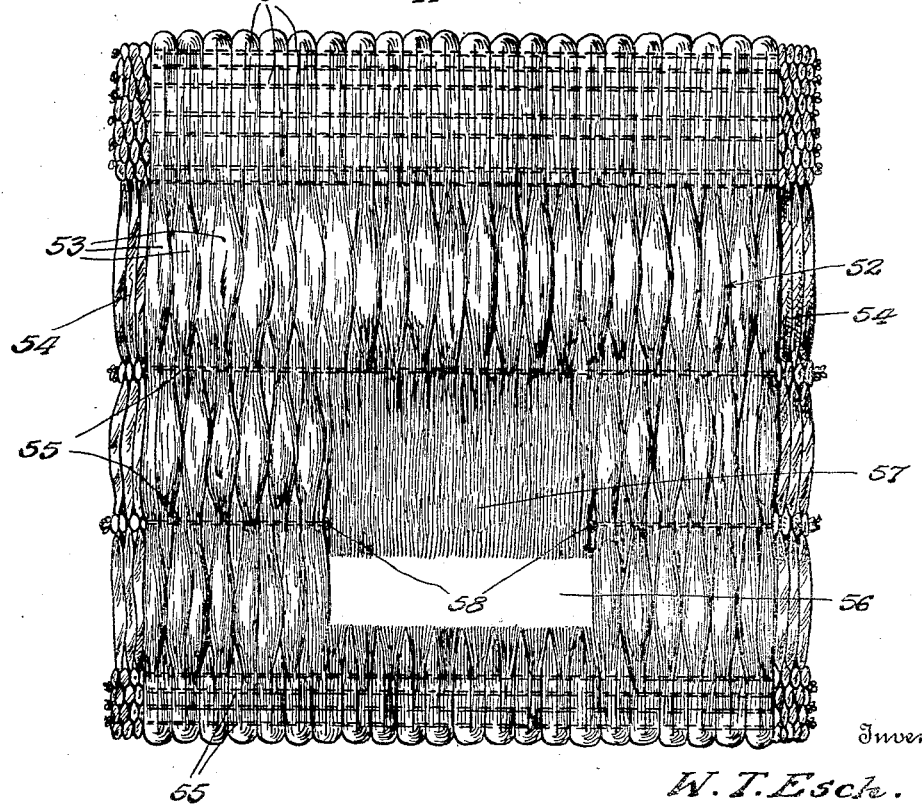

Fig. 2 is an enlarged transverse sectional view through the upper tier and its cover and a portion of the lower tier, the view being taken on the line 2—2 of Fig. 1, Fig. 3 is a top plan view of one of the tiers with the cover removed, Fig. 4 is a perspective view of a single laying tray having a modified construction, Fig. 5 is a sectional view through the modified form of tray taken on the line 5—5 of Fig. 4, Fig. 6 is a view similar to Fig. 4 with a modified form of mat applied thereto, and Fig. 7 is a top plan view of the mat shown in Fig. 6.

In Figure 1, there has been shown a plurality of nests arranged in tiers 1 and 2, the lower tier 2 of nests resting upon a platform or base 3. The upper and lower tiers of nests are of a duplicate construction and the upper tier forms a cover or top for the lower tier and in order to provide a shield or closure for the open top of the upper tier a cover or top 5 is set thereon. It will be obvious that the top or cover 5 may be applied to the lower tier in case the upper tier is omitted and it will also be obvious that additional tiers may be set in place if found necessary.

The tiers of nests are of a duplicate construction and each has a bottom 6 and end walls 7 which extend the full depth of the bottom. A bar 8 extends longitudinally of the tier of nests with its ends secured in recesses or seats 9 formed in the end walls 7. Upper and lower strips 10 are secured against the front edges of the end walls with the lower strip overlapping and secured against the front edge face of the bottom and a bar 11 extends across the rear of the tier with its ends secured in recesses or seats 12 formed in the end walls. A perch 13 extends in front of the nests and is hingedly mounted so that it may be swung upwardly, as indicated by dotted lines in Figure 2, and secured by hooks 13'. When raised, it serves as a barrier for the nests. A strip 14 which forms a rear wall for the upper portion of the tier of nests is hinged to the rear bar 12, as shown at 15, and along the lower edge portion of this rear wall is secured a strip of fabric 16 serving as a curtain to prevent a hen from being frightened by a person approaching the rear of the nest in order to remove eggs, as will be hereinafter set forth. Since the rear wall 14 is hingedly mounted, it may be swung upwardly in order to inspect the nests and this also permits a hen to be removed through the rear of the nest if she attempts to set. In addition it allows easy access when it is necessary to clean and disinfect the nests. Partitions 17 divide the frame or tier of nests into a plurality of compartments and these partitions have their front and rear portions formed with recesses or seats 18 and 19 to receive the bars 8 and 12 and are firmly secured by fasteners, such as nails or screws, passed through the bars and into the partitions. It should be noted that the partitions terminate in spaced relation to the bottom 6 so that laying trays may be set in place, as shown in Figure 2. It should also be noted that a strip of fabric 20 is secured along the bar 18. This strip of fabric extends downwardly from the bar and is cut in front of each partition, thereby providing a curtain for each compartment in order to shield the hen and prevent the hen from being alarmed and frightened off the nest in case a person in a hen house should pass in front of the nest. Separate curtains for the individual compartments may be provided instead of forming the curtains of a single strip of fabric. The top or cover 5 may be of any suitable construction, but has been illustrated in the form of sloping front and rear portions 21 secured upon bridges 22 which rest upon the end walls 7. It will be understood that additional bridges may be provided to rest upon the partitions 17 if so desired.

Within the frame and beneath the partitions 17 is disposed a series of laying trays corresponding in number to the compartments defined by the partitions. The strip 23 constituting the front wall for the series of laying trays is of sufficient length to extend between the end walls 7 of the frame of the tier of nests and from this strip extend strips 24 constituting side walls for the individual trays. A strip or bar 25 extends between the partitions or side walls 24 and is secured in recesses or seats 26 formed in the rear portions of these walls, and it should be noted that the walls extending from the ends of the front wall 23 project rearwardly from the bar 25 and also one of the intermediate partitions has been shown extended rearwardly beyond the rear bar. These rearwardly extended end portions of the partitions have straight cut rear ends, as shown in Figure 2, and against the straight cut ends engage an upturned flange 27 formed by bending upwardly the rear portion of a strip of wire screening 28 which forms a bottom for the rear portion of the row of laying trays. Recesses 29 are cut from the lower edge faces of the partitions or side walls 24 and have their upper edges extending rearwardly at a downward incline. This is also clearly shown in Figure 2 and against these downwardly inclined rear edges of the recesses the forward portion of the strip of screening or bottom 28 is firmly secured by staples or other suitable fasteners. Therefore, each of the laying trays in a row of trays will have its rear portion provided with a bottom of wire netting having sufficient resiliency to permit an egg to drop thereon without breaking. Between the side walls the wire bottom has portions pressed upwardly, as shown at 30, in order to form a deflector which will cause an egg to be directed towards a side wall as it rolls downwardly along the bottom thereby preventing eggs from accumulating in groups midway the side walls. By this arrangement an egg rolling rearwardly along the wire bottom of a tray will not be liable to strike another egg resting against the rear flange 27 and causing one or both eggs to be broken.

Each tray of the row of laying trays is provided with a seat or platform to be occupied by a hen. These seats or platforms are of a duplicate construction and each consists of a sheet of fine wire 31 similar to that used for window screens. This sheet of wire has its margins secured by staples or other suitable fasteners to the side walls and front wall and rear bar of the tray and before being secured is pressed downwardly, as clearly shown in Figure 2, so that when an egg is laid by a hen the egg will roll towards an opening 32 formed in the wire sheet above the forward portion of the bottom 28. Therefore, the egg will roll through the opening 32 and drop upon the sloping forward portion of the bottom along which it will roll until it comes to a rest against the upstanding flange 27. A nest egg 33 is secured to the forward portion of the sheet of screening in front of the opening or passage 32 and this nest egg is disposed above a covering 34 which provides a soft seat. This covering consists of strands of fiber which are secured between upper and lower bordering strips 35 and 36 cut from wire screening having a coarse mesh similar to the screening from which the bottom 28 is formed and it should be noted that the strands extend inwardly from the bordering strips but terminate about the margins of the opening 32. Therefore, the nest will be very comfortable when occupied by a hen but the opening 32 will be unobstructed and an egg can easily roll through this opening.

It will be obvious that a nest could be built with a single laying compartment instead of a number disposed side by side in which case a single laying tray will be used instead of a series of trays. A single laying tray is illustrated in Figures 4 and 5 but in some respects this tray is slightly different from the trays of the series shown in Figures 1, 2 and 3. This tray has a frame consisting of a front wall 37 and side walls 38 to which is secured a rear bar or strip 39, and it should be noted that the rear end portions of the side walls project rearwardly from the rear bar with their upper edge faces extending rearwardly at a downward incline and terminating in straight cut ends against which the rear flange 40 of the wire bottom 41 is secured. This bottom 41 is formed from a sheet of coarse wire similar to the wire from which the bottom 28 is formed and has its forward portion bent upwardly at an incline and secured against the upper edges of recesses 42 formed in the side walls and corresponding to the recesses 29. The bottom is also pressed upwardly intermediate its width to form a deflector 43 corresponding to the deflector 30. The seat or platform 44 consists of a sheet of wire netting which may be coarse wire similar to that from which the bottom 41 is formed or may be fine wire similar to that from which the seat 31 is formed. This sheet of wire is secured about its margins to the upper faces of the rear bar 39 and front and side walls and is covered by a sheet of fabric 45 which may be cotton or any other suitable material. An opening 46 is formed in the fabric cover to register with an opening 47 formed in the seat 44, and it should be noted that when the sheets of wire and fabric are cut to form the openings tongues 48 and 49 are left attached to the sheets which are bent downwardly, as shown in Figure 5, with the tongue 48 extending rearwardly from the front edge of the opening 47 in overlying relation to the forward portion of the bottom 41 and the tongues 49 extending downwardly through the opening 47. By this arrangement an egg may roll through the openings along the tongue 48 onto the rearwardly inclined portion of the bottom and the tongues 49 will serve to check rearward movement of the egg to a certain extent and also serve as shields to prevent a hen from seeing through the openings. A nest egg 50 is secured upon the forward portion of the sheet or cover 45 by suitable fastening means passed through the forward portion of the sheet of wire screening forming the seat 44, and in order to form a comfortable seat there has been provided fiber strands arranged in groups, as shown at 51, and secured by staples or other suitable fasteners 52. These groups of fiber strands extend towards the opening formed in the sheet and terminate about the margins thereof so that the opening is unobstructed. It will be obvious that a series of single laying trays could be placed in the compartments of the series of nests and individually removed if so desired.

In Figures 6 and 7, there has been illustrated a modified form of mat applied to a nest of the type shown in Figures 4 and 5 and similar parts are designated by the same reference numerals. The mat illustrated in these figures and indicated in general by the numeral 52 consists of fiber strands 53 which extend longitudinally of the mat and folded back upon themselves at the ends of the mat. It may consist of a single strand folded back and forth upon itself or a number of strands. An edging 54 formed of twine is provided at each side of the mat and in order to bind the twine and fiber together they are interwoven by cross cords 55. A greater number of cross cords are used near the front and rear ends of the mat in order to reinforce these ends. By this arrangement a strong mat will be formed and staples or the like can be driven through end and side portions of the mat to firmly secure it to the laying tray in covering relation to the sheet of wire fabric 44. Intermediate the width of the mat and near the rear end thereof the fiber strands are cut, as shown at 56, to form a fibrous tongue 57 disposed over the opening in the wire fabric and permitting eggs to pass through the mat. At opposite sides of this tongue the cross cords are tied, as shown at 58, to prevent raveling.

When the improved nest is in use, the platform 3 is set in place and the lower tier of nests rests upon the platform. The cover 5 may be applied directly to the lower tier or one or more upper tiers may be set in place one above the other upon the lower tier and the cover applied to the topmost tier. The laying trays are thrust inwardly from the back beneath the rear walls or strips 14 and these laying trays terminate at their front substantially flush with the forward ends of the partitions 20 so that space is provided between the laying trays and the front wall 10 in which gypsum or other suitable material may be placed, as shown at 59, in order to form a mat which serves to clean a hen's feet and prevents the seats of the laying trays from becoming soiled. A hen passes inwardly through the open front of the frame or housing of the nest and steps past the curtain 20 into one of the compartments and sits upon the seat of the laying tray therein. When an egg is laid, it rolls through the opening in the seat and drops upon the wire bottom of the laying tray along which it rolls to the rear flange without becoming broken. As previously explained, the deflector formed upon the bottom prevents the eggs from all stopping at approximately a point midway the side walls of the laying tray and there is less danger of an egg striking another and causing one or both eggs to be broken. A person desiring to collect eggs may walk behind the nest and since the rear portions of the laying trays project rearwardly, as shown in Figure 2, the eggs may be removed without disturbing a hen upon a nest. Since the eggs drop into the lower portions of the nests immediately after being laid, they will be prevented from becoming soiled and also allowed to cool quickly and prevented from being subjected to heat of a hen occupying the nest. When it is necessary to clean and disinfect the nest, the rear walls 14 may be swung upwardly and the trays withdrawn as a unit and the gypsum removed. The laying tray and the entire nest may then be very easily and thoroughly cleaned and disinfected and the laying tray then slid back into place.

Having thus described the invention, I claim:

1. A laying tray comprising a frame open at its back and having front and side walls, a bottom for the rear portion of said frame having an upstanding flange at its rear, recesses being formed in the side walls having upper walls extending forwardly at an upward incline and the forward portion of the bottom being bent upwardly and secured against the upper walls of the recesses, and a seat carried by said frame and formed with an egg passage located above the forward portion of the bottom in front of the deflector.

2. A laying tray comprising a frame open at its back and having front and side walls, a bottom for the rear portion of said frame having an upstanding flange at its rear and having its forward portion extending at an upward incline, a seat carried by said frame and consisting of a sheet of wire mesh secured about its margins to the frame and sagging in the frame, the sheet having an opening formed therein constituting an egg passage located over the forward portion of the bottom, a sheet of fabric covering the wire sheet and formed with an opening registering with the opening therein, and tongues projecting from the sheets through the openings from opposed marginal portions thereof and converging downwardly and terminating adjacent the forward portion of the bottom.

3. In combination, a housing open at its front and rear and having a bottom and end walls, partitions spaced transversely from each other between the end walls and spaced from the bottom, said partitions dividing the housing into compartments, and a series of laying trays formed as a unitary structure, said trays resting upon the bottom beneath the partitions and free from the same with a tray disposed in each compartment, the series of trays being removable as a unit through the open rear of the housing.

4. In combination, a housing open at its front and rear and having a bottom and end walls, partitions spaced transversely from each other between the end walls and spaced from the bottom and open front of the housing, said partitions defining separate compartments in the housing and an entrance chamber between the compartments and front of the housing extending the full width of the housing and having all of the compartments communicating therewith, and a series of laying trays formed as a unitary structure and slid into place through the open rear end of the housing upon the bottom beneath the partitions with each tray disposed in a compartment.

5. A seat for a laying tray comprising a sheet of fabric having an opening formed therein, a covering for the sheet consisting of a mat of fibrous strands extending longitudinally of the mat, and cross cords interwoven with the strands, strands forming a portion of the mat being cut transversely to form an opening and a tongue disposed over the opening in the sheet whereby eggs can pass through the mat and sheet.

6. A seat for a laying tray comprising a mat consisting of fibrous strands extending between front and rear edges of the mat, strands of twine at opposite sides of the mat, and cross cords interwoven with the twine and fibrous strands, cross cords near the front and rear ends of the mat being close together to form reinforcements for the same, strands intermediate the width of the mat being cut to form an opening and tongue.

7. A seat for a laying tray comprising a mat consisting of fibrous strands extending between front and rear edges of the mat, strands of twine at opposite sides of the mat, and cross cords interwoven with the twine and fibrous strands, strands intermediate the width of the mat being cut to form an opening and tongue.

8. A seat for a laying tray comprising a mat consisting of fibrous strands extending between front and rear edges of the mat, cross cords interwoven with said strands, cords near the front and rear ends of the mat being close together, and intermediate cords being spaced farther apart, strands intermediate the width of the mat being cut to form an opening and tongue and one of the cross cords having portions terminating at opposite sides of the opening.

9. A seat for a laying tray comprising a mat consisting of fibrous strands and cross cords interwoven therewith, certain of the strands being cut to form an egg passage and tongue for the same.

10. A laying tray comprising a frame open at its back and having front and side walls, a bottom for the rear portion of said frame having an upstanding flange at its rear, the side walls being provided with portions extending forwardly at an upward incline, the front portion of the bottom being extended upwardly and secured against the inclined portions of the side walls, and a seat carried by said frame and formed with an egg passage located above the forward portion of the bottom.

In testimony whereof I affix my signature.

WILLIAM T. ESCH. [L. S.]